United States Patent
Saito et al.

(10) Patent No.: US 6,348,279 B1
(45) Date of Patent: Feb. 19, 2002

(54) SEPARATOR FOR POLYMERIC ELECTROLYTE FUEL CELL HAVING A ROUGHENED SURFACE

(75) Inventors: Kazuo Saito; Atsushi Hagiwara; Fumio Tanno, all of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/288,108

(22) Filed: Apr. 8, 1999

(30) Foreign Application Priority Data

Apr. 10, 1998 (JP) .......................................... 10-099017

(51) Int. Cl.$^7$ ................................................. H01M 2/00
(52) U.S. Cl. ............................................. 429/34; 429/38
(58) Field of Search .............................. 429/34, 35, 36, 429/38

(56) References Cited

FOREIGN PATENT DOCUMENTS

| JP | 59 213 610 A | * | 12/1984 |
| JP | 04 282 565 A | * | 10/1992 |
| JP | 09 055 215 A | * | 2/1997 |

* cited by examiner

*Primary Examiner*—Nam Nguyen
*Assistant Examiner*—Gregg Cantelmo
(74) *Attorney, Agent, or Firm*—Kubovcik & Kubovcik

(57) ABSTRACT

The present invention provides a separator for a polymer electrolyte fuel cell, having, at the surface contacting with the electrode of the fuel cell, a surface roughness of Ra=0.1 to 10 $\mu$m when measured by a surface roughness tester having a probe of 5 $\mu$m in front end diameter; and a process for producing the above separator for a polymer electrolyte fuel cell, which process comprises immersing a molding of a separator for a polymer electrolyte fuel cell, in an acidic solution. The above separator for a polymer electrolyte fuel cell alleviates the problems of the prior art and has low contact resistance at the interface with the electrode of the fuel cell.

2 Claims, No Drawings

SEPARATOR FOR POLYMERIC ELECTROLYTE FUEL CELL HAVING A ROUGHENED SURFACE

BACKGROUND OF THE INVENTION (1) Field of the Invention

The present invention relates to a separator for polymer electrolyte fuel cell, as well as to a process for production of the separator.

(2) Description of the Prior Art

Fuel cells have various merits. For example, use of fossil fuel (to which resource impoverishment attention must be paid) is not substantially necessary; substantially no noise is made during power generation; and the recovery of energy can be made high as compared with other fuel power-generating systems. Therefore, fuel cells are being developed for use as a relatively small power plant for buildings or factories.

In particular, polymer electrolyte fuel cells operate at low temperatures as compared with other type fuel cells and do not corrode parts thereof, and accordingly, substantially no attention is necessary for corrosion of materials; can discharge a relatively large current despite the low-temperature operation; therefore, are drawing attention as a substitute energy source for internal combustion engine for automobile.

Of the parts constituting the polymer electrolyte fuel cell, the separator has functions of (1) securing paths for a reaction gas entering the fuel cell and (2) transferring the electric energy produced in the fuel cell, to outside. To fulfill these functions sufficiently, the separator of polymer electrolyte fuel cell is required to have not only high conductivity in the surface direction and the thickness direction, but also low contact resistance at the interface with the electrode.

In conventional separators for polymer electrolyte fuel cell, no particular attention has been paid to the contact resistance at the interfaces with the electrode. Hence, it has been desired to develop a separator for polymer electrolyte fuel cell, having low contact resistance at the interface with the electrode.

SUMMARY OF THE INVENTION

The objects of the present invention are to provide a separator for polymer electrolyte fuel cell which alleviates the above-mentioned problems of the prior art and which has low contact resistance at the interface with the electrode; and a process for producing such a separator.

In order to achieve the above objects, the present inventors made a study. As a result, the present inventors came to an idea that a separator for polymer electrolyte fuel cell, having a surface roughness of particular range at the surface contacting with the electrode of the fuel cell might have low contact resistance at the interface with the electrode. The present inventors made a further study and have completed the present invention.

According to the present invention, there is provided a separator for polymer electrolyte fuel cell, having, at the surface contacting with the electrode of the fuel cell, a surface roughness of Ra=0.1 to 10 µm when measured by a surface roughness tester having a probe of 5 µm in front end diameter.

According to the present invention, there is further provided a process for producing a separator for polymer electrolyte fuel cell, having, at the surface contacting with the electrode of the fuel cell, a surface roughness of Ra=0.1 to 10 µm when measured by a surface roughness tester having a probe of 5 µm in front end diameter, which process comprises immersing a molding of separator for polymer electrolyte fuel cell, in an acidic solution.

DETAILED DESCRIPTION OF THE INVENTION

The present invention is hereinafter described in detail.

The separator for polymer electrolyte fuel cell according to the present invention has the same constitution as conventional fuel cell separators except that the present separator has a surface roughness of particular range at the surface contacting with the electrode of the fuel cell.

That is, the present separator for polymer electrolyte fuel cell is obtained by (1) molding, for example, a carbon composite material comprising a conductive powder and a thermosetting resin or a thermoplastic resin, a glassy carbon, a graphite material, a metal material, or a composite material obtained by coating or impregnating a graphite material or a metal material with a resin, a glassy carbon or a metal, into a shape of separator for polymer electrolyte fuel cell by an appropriate method and then (2) subjecting the resulting molding to an acid treatment to have the above-mentioned surface roughness.

The material for the present separator is described specifically. When there is used, as the material for the present separator for polymer electrolyte fuel cell, a carbon composite material comprising a conductive powder and a thermosetting resin or a thermoplastic resin, the conductive powder in the carbon composite material is at least one kind selected from, for example, artificial graphite, scaly graphite, amorposis graphite, expanded graphite, kish graphite, carbon black, acetylene black, Ketjen Black and amorphous carbon. However, there is no particular restriction as to the kind of the conductive powder.

The thermosetting resin in the carbon composite material is at least one kind selected from, for example, polycarbodiimide resins, phenolic resins, furfuryl alcohol resins, epoxy resins, cellulose, urea resins, melamine resins and diallyl phthalate resin. However, there is no particular restriction as to the kind of the thermosetting resin.

The thermoplastic resin in the carbon composite material is at least one kind selected from polyethylene, polystyrene, polypropylene, polymethyl methacrylate, polyethylene terephthalate, polybutylene terephthalate, polyethersulfone, polycarbonate, polyoxamethylene, polyamide, polyimide, polyamideimide, polyvinyl alcohol, polyvinyl chloride, fluroresin, polyphenylsulfone, polyetheretherketone, polysulfone, polyetherketone, polyarylate, polyetherimide and polymethylpentene. However, there is no particular restriction as to the kind of the thermoplastic resin.

In the carbon composite material, the proportions of the conductive powder and the thermosetting resin or the ther moplastic resin can be, for example, 5 to 100 parts by weight of the thermosetting resin or the thermoplastic resin per 100 parts by weight of the conductive powder. When the proportion of the thermosetting resin or the thermoplastic resin is smaller than 5 parts by weight, the resulting separator has insufficient strength and may be unusable as a separator. When the proportion is larger than 100 parts by weight, the resulting separator has low conductivity and may not properly function as a separator.

As the material for the present separator for polymer electrolyte fuel cell, there can also be used, besides the above-mentioned carbon composite material, a glassy carbon, a graphite material, a metal material, or a composite material obtained by coating or impregnating a graphite material or a metal material with a resin, a glassy carbon or a metal, preferably a corrosion-resistant metal.

The metal material includes, for example, titanium, stainless steel, gold, silver, copper, aluminum and niobium. The resin is at least one kind selected from the thermosetting resins and thermoplastic resins usable in the above-mentioned carbon composite material. The corrosion-resistant metal to be coated or impregnated can be selected from metals such as titanium, stainless steel, gold, silver, copper, niobium, platinum and the like.

The present separator for polymer electrolyte fuel cell is characterized by having, at the surface contacting with the electrode of the fuel cell, a surface roughness of Ra=0.1 to 10 $\mu$m when measured by a surface roughness tester having a probe of 5 $\mu$m in front end diameter.

When the surface roughness (Ra) is larger than 10 $\mu$m when measured as mentioned above, such a separator has too rough surface and its area contacting with electrode is small, resulting in large contact resistance. When the surface roughness (Ra) is smaller than 0.1 $\mu$m, such a separator has too flat surface and its area contacting with electrode is small, which also tends to result in large contact resistance.

The present separator for polymer electrolyte fuel cell can have the above-mentioned surface roughness by conducting an acid treatment (described later) according to the present process for separator production.

Prior to the acid treatment according to the present process for separator production, first a molding of separator for polymer electrolyte fuel cell is produced using the above-mentioned material.

That is, when there is used, as the material for separator, for example, a carbon composite material comprising a conductive powder and a thermosetting resin or a thermoplastic resin, the conductive powder and the thermosetting resin or the thermoplastic resin are mixed. In this mixing step, an ordinary industrial mixing method (e.g. stirring rod, kneader, ball mill, sample mill, mixer, static mixer or ribbon mixer) can be used. At that time, granulation may be conducted because it provides improved moldability in a later molding step.

The thus-obtained mixture of the conductive powder and the resin is shaped into a desired molding of separator for polymer electrolyte fuel cell. This shaping can be conducted by machining, or by a known molding method such as pressure molding, hydrostatic pressure molding, extrusion molding, injection molding, belt press, press molding, press heating, roll pressing or the like, or by a combination of the above two or more molding methods.

The temperature employed in shaping the mixture is determined depending upon the resin used in the mixture, but can be, for example, ordinary temperature to 400° C. In order to chemically stabilize the molding obtained, the molding may be heat-treated.

Also, when there is used, as the material for separator, for example, a graphite material, a glassy carbon or a metal material, such a material is shaped into a desired molding of separator for polymer electrolyte fuel cell. This shaping can be conducted by machining, or by a known molding method such as pressure molding, hydrostatic pressure molding, extrusion molding, injection molding, belt press, press molding, press heating, roll pressing or the like, or by a combination of the above two or more molding methods.

Further, when there is used, as the material for separator, for example, a composite material obtained by coating or impregnating a graphite material or a metal material with a resin, a glassy carbon, a metal or the like, the graphite material or the metal material is shaped by machining, or by a known molding method such as pressure molding, hydrostatic pressure molding, extrusion molding, injection molding, belt press, press molding, press heating, roll pressing or the like, or by a combination of the above two or more molding methods; and the shaped material is coated or impregnated with the resin, the glassy carbon, the metal or the like.

In the present process for producing the present separator for polymer electrolyte fuel cell, the above-obtained molding of separator for polymer electrolyte fuel cell is subjected to, for example, an acid treatment (specifically, immersion in acidic solution) or a blasting treatment (specifically, pounding the blast by blasting media), to obtain a separator for polymer electrolyte fuel cell according to the present invention, which has the above-mentioned surface roughness.

The acidic solution usable in the present process includes hydrochloric acid, sulfuric acid, nitric acid, acetic acid, formic acid, hydrofluoric acid and any mixture thereof.

The concentration of acidic solution, the time of immersion therein, etc. employed in the present process can be determined depending upon the separator material used and the desired surface roughness of separator. However, there can be mentioned, for example, 20 to 100% by weight as the concentration of acidic solution and one minute or more as the immersion time.

The acid-treated separator for polymer electrolyte fuel cell is washed to remove the acidic solution remaining thereon and then dried by means of dryer or the like, to obtain a final product. The shape of the blasting media usable in the present process includes sand shape, grit shape, shot shape, sphere shape and mixture thereof. The blasting medium material is at least one kind selected from resin, carbon, aluminium oxide, stainless, silicon carbide, glass. However, there is no particular restriction as to the kind of the blasting medium material.

DESCRIPTION OF THE PREFERRED EMBODIMENTS

The present invention is described in detail below by way of Examples.

EXAMPLES 1 to 8

A natural graphite powder (average particle diameter: 7 $\mu$m) and a phenolic resin were mixed at proportions shown in Table 1. The resulting mixture was molded at 150° C. at 300 kg/cm$^2$ using a die capable of producing a separator molding. The separator molding produced was immersed in an acidic solution to apply a surface treatment to the molding, whereby a separator for polymer electrolyte fuel cell according to the present invention was obtained (the term "separator" used in the following Examples has the same meaning). The conditions employed in the surface treatment are shown in Table 1. The separator was measured for surface roughness by the method described in JIS B 0601-1994, using a surface roughness tester (SURFTEST SV-514, a product of Mitsutoyo Mfg. Co., Ltd.) having a probe of 5 $\mu$m in front end diameter (the same test method and the same tester were used also in the following Examples), and the results are shown in Table 1.

The separator was also measured for contact resistance when contacted with a carbon paper. That is, there were prepared three laminates, i.e. copper foil-separator-copper foil, copper foil-porous material (carbon paper)-copper foil, and copper foil-separator-porous material (carbon paper)-copper foil. Each laminate was pressed-bonded at a pressure of 2 kg/cm2; a lead wire was connected to each copper foil to prepare three kinds of test pieces; each test piece was measured for voltage by the four-probe method. From the voltages obtained for individual test pieces was determined a voltage reduction between separator and porous material, and the contact resistance of the separator was determined from the following formula. The results are shown in Table 1.

Contact resistance=(voltage reduction)×(contact area)/current

EXAMPLE 9

A separator was produced in the same manner as in Example 1 except that the phenolic resin was changed to a polypropylene. The separator was measured for surface roughness and contact resistance in the same manners as in Examples 1 to 8. The results are shown in Table 2.

EXAMPLE 10

A separator was produced in the same manner as in Example 2 except that the natural graphite powder was changed to an artificial graphite powder (average particle diameter: 7 $\mu$m). The separator was measured for surface roughness and contact resistance in the same manners as in Examples 1 to 8. The results are shown in Table 2.

EXAMPLE 11

A titanium plate was molded into a separator shape by machining and then acid-treated so as to have a surface roughness (Ra) of 1 $\mu$m, to obtain a separator. The separator was measured for surface roughness and contact resistance in the same manners as in Examples 1 to 8. The results are shown in Table 2.

EXAMPLE 12

A glassy carbon plate was molded into a separator shape by machining and then acid-treated so as to have a surface roughness (Ra) of 1 $\mu$m, to obtain a separator. The separator was measured for surface roughness and contact resistance in the same manners as in Examples 1 to 8. The results are shown in Table 2.

EXAMPLE 13

A stainless steel plate was molded into a separator shape by machining and then acid-treated. The resulting material was washed, after which gold was deposited thereon by vapor deposition to obtain a separator. The separator had a surface roughness (Ra) of 1 $\mu$m. The separator was measured for surface roughness and contact resistance in the same manners as in Examples 1 to 8. The results are shown in Table 2.

TABLE 1

| | Examples | | | | | | | |
| --- | --- | --- | --- | --- | --- | --- | --- | --- |
| | 1 | 2 | 3 | 4 | 5 | 6 | 7 | 8 |
| Materials for separator | | | | | | | | |
| Natural graphite | 100 | 100 | 100 | 100 | 100 | 100 | 100 | 100 |
| Phenolic resin | 25 | 25 | 25 | 10 | 100 | 25 | 25 | 25 |
| Kind of acid | Aqueous 30 wt. % sulfuric acid | Aqueous 30 wt. % sulfuric acid | Aqueous 30 wt. % sulfuric acid | Aqueous 30 wt. % sulfuric acid | Aqueous 30 wt. % sulfuric acid | Aqueous 30 wt. % sulfuric acid | Aqueous 30 wt. % sulfuric acid | Aqueous 30 wt. % hydrochloric acid |
| Treating conditions (temp. × time) | 90° C. × 5 min | 90° C. × 30 min | 90° C. × 60 min | 90° C. × 10 min | 90° C. × 10 min | 90° C. × 60 min | 90° C. × 60 min | 90° C. × 3 min |
| Surface roughness (Ra:$\mu$m) | 0.1 | 1 | 10 | 0.1 | 10 | 1.1 | 0.1 | 10 |
| Contact resistance (m$\Omega \cdot$ cm$^2$) | 18 | 8 | 11 | 18 | 11 | 11 | 19 | 12 |

TABLE 2

| | Examples | | | | |
|---|---|---|---|---|---|
| | 9 | 10 | 11 | 12 | 13 |
| Materials for separator | | | | | |
| Natural graphite (wt. %) | 100 | | | | |
| Artificial graphite (wt. %) | | 100 | | | |
| Phenolic resin (wt. %) | | 25 | | | |
| Polypropylene (wt. %) | 25 | | | | |
| | | | Titanium plate | Glassy carbon plate | Stainless steel plate* |
| Kind of acid | Aqueous 30 wt. % sulfuric acid | Aqueous 30 wt. % sulfuric acid | Aqueous 30 wt. % sulfuric acid | Aqueous 30 wt. % sulfuric acid | Aqueous 30 wt. % sulfuric acid |
| Treating conditions (temp. × time) | 90° C. × 5 min | 90° C. × 30 min | 90° C. × 10 min | 90° C. × 10 min | 90° C. × 60 min |
| Surface roughness (Ra;μm) | 1 | 1 | 1 | 1 | 1 |
| Contact resistance (mΩ · cm²) | 10 | 10 | 8 | 8 | 9 |

*Gold deposited thereon after acid treatment

Comparative Examples 1 and 2

The separator at molding before acid treatment, obtained in Example 2 was subjected to lapping and polishing to obtain a separator having a surface roughness shown in Table 3. The separator was measured for contact resistance in the same manner as in Examples 1 to 8. The results are shown in Table 3.

Comparative Example 3

A glassy carbon plate was molded into a separator shape by machining and then subjected to lapping and polishing to obtain a separator having a surface roughness (Ra) of 0.01 μm. The separator was measured for contact resistance in the same manner as in Examples 1 to 8. The results are shown in Table 3.

Comparative Example 4

A stainless steel plate was molded into a separator shape by machining, after which gold was deposited thereon by vapor deposition to obtain a separator. The separator had a surface roughness (Ra) of 0.01 μm. The separator was measured for contact resistance in the same manner as in Examples 1 to 8. The results are shown in Table 3.

TABLE 3

| Comparative Examples | | 1 | 2 | 3 | 4 |
|---|---|---|---|---|---|
| Materials for separator | Natural graphite (wt %) | 100 | 100 | | |
| | Phenolic resin (wt %) | 25 | 25 | | |
| | | | | Glassy carbon plate | |
| | | | | | Stainless steel plate* |
| Surface roughness (Ra;μm) | | 0.03 | 30 | 0.01 | 0.01 |
| Contact resistance (mΩ · cm²) | | 50 | 80 | 60 | 60 |

*gold deposited thereon

As stated above, in the separator for polymer electrolyte fuel cell according to the present invention, the surface roughness at the surface contacting with the electrode of the fuel cell is controlled at a particular range of Ra=0.1 to 10 μm when measured by a surface roughness tester having a probe of 5 μm in front end diameter; therefore, the present separator has low contact resistance at the interface with the electrode. Further, the separator can be easily produced according to the present process, by immersing a molding of separator for polymer electrolyte fuel cell, in an acidic solution.

What is claimed is:

1. A separator for a polymer electrolyte fuel cell, having, at a surface of the separator contacting with an electrode of the fuel cell, a surface roughness of Ra ranging from 0.1 to 10 μm when measured according to JIS B 0601-1994 by a surface roughness tester having a probe of 5 μm in front end diameter, said separator being made of a carbon composite material comprising a conductive carbon powder and a thermosetting resin or a conductive carbon powder and a thermoplastic resin.

2. A separator for a polymer electrolyte fuel cell, having, at a surface of the separator contacting with an electrode of the fuel cell, a surface roughness of Ra ranging from 0.1 to 10 μm when measured according to JIS B 0601-1994 by a surface roughness tester having a probe of 5 μm in front end diameter, said separator being made of (a) a glassy carbon, (b) a graphite material, (c) a metal material, or (d) a composite material obtained by coating or impregnating a graphite material or a metal material with a resin, a glassy carbon or a corrosion-resistant metal.

* * * * *